Dec. 12, 1939.  R. W. SMITH  2,183,174
INSULATED DUCT CONSTRUCTION
Filed March 15, 1937  2 Sheets-Sheet 1
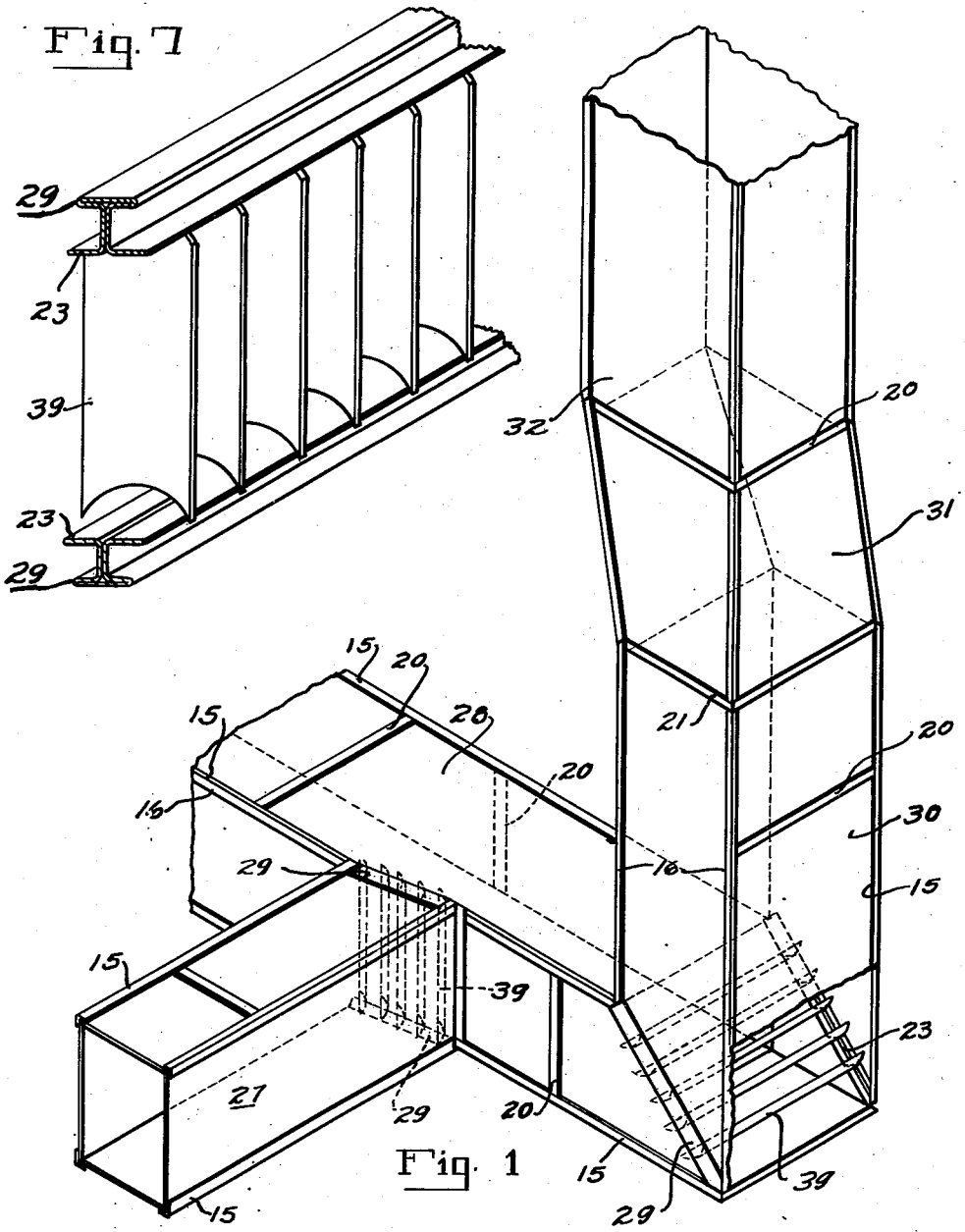
INVENTOR
Robert Wiley Smith
BY
Johnston & Jennings
ATTORNEYS Dec. 12, 1939.  R. W. SMITH  2,183,174
INSULATED DUCT CONSTRUCTION
Filed March 15, 1937  2 Sheets—Sheet 2
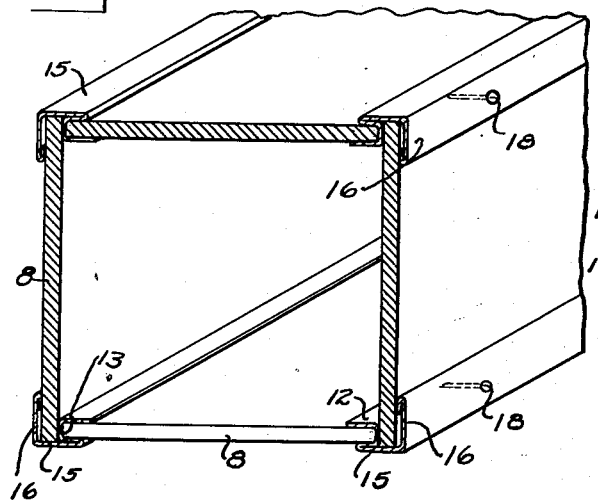
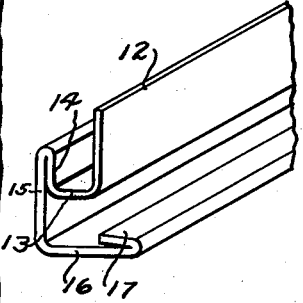
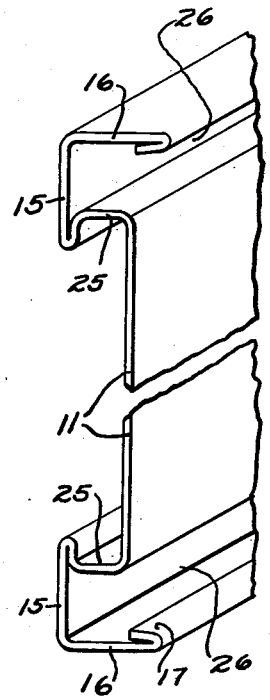
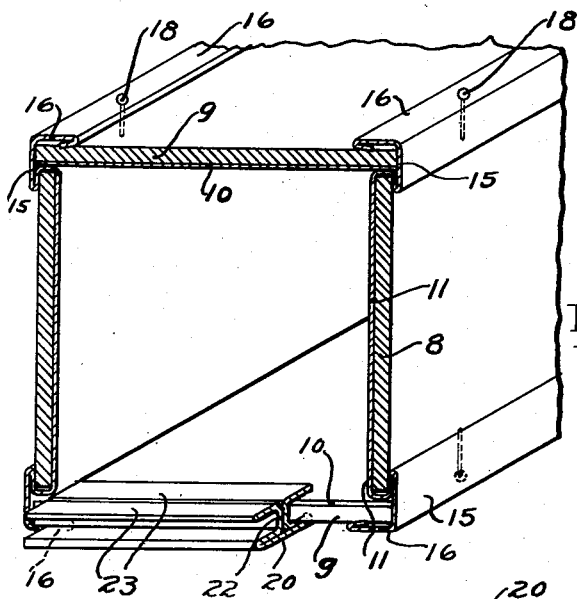
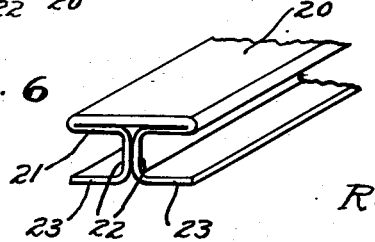
INVENTOR
Robert Wiley Smith
BY
*Johnston & Jennings*
ATTORNEYS Patented Dec. 12, 1939

2,183,174

UNITED STATES PATENT OFFICE 2,183,174

INSULATED DUCT CONSTRUCTION

Robert Wiley Smith, Columbus, Ga.

Application March 15, 1937, Serial No. 131,004

5 Claims. (Cl. 138—39)

My invention relates to an insulated duct construction, particularly, but not exclusively, applicable to air conditioning systems and the like where it is a desideratum that the duct be capable of ready assemblage on the job from parts shipped knocked-down, and that the assembled parts shall form an insulated duct possessing a neat and attractive appearance and having the air-tightness, rigidity and strength requisite for all purposes incidental to its contemplated use.

The chief object of my invention is to produce a duct by the use of reinforcing corner strips which serve to interlock the meeting edges of the walls of the duct. More particularly, these corner strips, which may be used separately or connected to a common side plate, are devised to produce pockets disposed at right angles and having the edge of the metal forming a wall of at least one pocket in each corner strip bent over in position to form a spring clamping and retaining means for binding the assembled duct walls securely in position in such pocket so as to insure against leakage.

My invention further contemplates assembling a metal lined duct by the use of opposed metallic side wall plates, each carrying, or formed with, a pair of corner strips adapted to receive insulation for the side plates and also metal backed insulation strips cut from stock to form top and bottom walls for the duct which are variable in width to provide the requisite capacity for the duct.

My invention contemplates a less expensive type of unlined duct in which separate corner strips are utilized to assemble strips of insulation, or all of the duct walls may be formed by separate insulated metal strips.

My invention further contemplates arranging the sheets, or plates, or strips forming the duct walls at break joints and so connecting them by nails or screws to the corner strips that the whole duct is interlocked into a tight, strong, rigid structure.

My invention further contemplates the provision of a butt joint strip which is interposed wherever the butt joints fall along the wall sections of the duct, and which provides opposed pockets to receive, and to be attached by screws or nails placed through, the edges of the lined or unlined insulation strips meeting at the butt joints thereby to tie these duct wall members securely together with neat, tight joints.

My invention further comprises assembling turning vanes between spaced butt joint strips to form deflector elements that can be readily set in any desired wall or bend of the duct for the purpose of deflecting the air currents, without eddies or retardation, around corners or into laterals, as occasion may require.

My invention further comprises the novel details of construction and arrangement of parts hereinafter more particularly described and claimed, reference being had to the accompanying drawings which form a part of this specification, and in which Fig. 1 is a perspective view showing a section of duct comprising a lateral and a vertical bend with a transition member forming part of an air conditioning system;

Figs. 2 and 3 are cross sectional views showing in perspective views sections of different types of ducts, that in Fig. 2 being unlined, and that in Fig. 3 being metal lined and having associated therewith a broken showing of a butt joint strip;

Fig. 4 is a detail perspective view of a corner strip;

Fig. 5 is a corresponding view, broken away, showing the metallic side plate for a duct formed along its opposite edges, with corner strips corresponding substantially to the showing in Fig. 4;

Fig. 6 is a perspective view of a butt joint strip; and

Fig. 7 is a perspective view of an assembled butt joint and turning vane strip.

Similar numerals refer to similar parts throughout the drawings.

The duct may be made up of wall strips 8 composed only of any suitable insulation, such as cork, fiber board, and the like, or of strips 9 of insulation that are metal lined by being cemented to a galvanized metal backing plate such as 10. The insulation strip 8 may also be slipped into assembled relationship with a metallic side wall 11 of the duct. The insulation will be, in all instances, exposed and may be given any decorative surface treatment to harmonize with the structure in which the duct is located. It is contemplated that the wall stock, lined or unlined, will be shipped as strips in standard lengths and in widths to order, or as sheets and cut to width or length, and they will be assembled on the job to form the ducts by the utilization of the assembling elements comprising the corner reinforcing strips and the butt joint strips which will be later described.

In Fig. 2 I illustrate the simplest and least expensive embodiment of my invention, wherein I form the duct walls of unlined strips of fiber or like insulation, and assemble them by the use of separate corner strips illustrated in Fig. 4 and formed substantially as follows:

A blank strip of suitable length of copper, aluminum, or any suitable light flexible metal is bent parallel with its length to form two pockets one pocket being defined by the sides 12, 13 and 14, and the other pocket by wall 13 and legs 15 and 16 of the corner angle, the leg 16 being spaced from the pocket wall 13 beyond which it projects, and has its free edge 17 bent over upon its inner face to form a neat finish and to provide a reinforcing and binding lip which, by spring engagement with the insulation, will tend to retain it in the pocket and to insure an air-tight joint. I do not show such a lip along the edge of the pocket wall 12, because the latter is concealed within the duct, but it could be used there were it desired for its leak proof effect.

The assemblage of the duct using these corner strips will be very readily understood from Fig. 2, where the corner strips have the walls they respectively connect forced into their pockets and against the inner pocket walls 13 and 15, and the whole duct thus assembled is then interlocked by the application of nails 18 driven through the portions 16 and 13 of each corner strip and through one wall and into an edge of the other wall which are connected by such strip. These fastening nails serve as a simple and ready means of assemblage and at the same time they force the corner strip edges 17 against the outer faces of the side walls that they respectively engage, and they anchor the top and bottom walls securely against the inner walls 13 of the sockets provided for them, thus insuring a neat and attractive reinforcing corner brace and trim which assembles the duct effectively and in leak proof manner.

In assembling the duct its several walls will be formed by strip sections which should be so arranged that they meet at break joints so that no strip joints would fall in a common transverse plane except at an end of a duct section.

Where the edges of duct wall sections abut, I obtain a tight and finished joint by the utilization of butt joint strips illustrated in Fig. 6, and shown in working relation in Fig. 3. These strips are likewise formed of suitable light metallic strip stock, the center panel 20 of which forms an exposed face, and the edges of the strip are bent under to form walls 21, 22 and 23 defining oppositely facing pockets. The walls 23 have substantially the width of the panel 20 and the pockets are adapted to receive with a snug fit the meeting ends of the wall sections, whether lined or unlined, that they join. This butt joint strip may be cut to length to fit between the side corner strips in which are mounted the wall sections it connects. To close the joint entirely to its ends which are received in the pocket of the corner strips, the butt joint strips may be trimmed to leave portions of their walls 22 projecting at each end sufficient to fill the joint area lying in the corner strip pockets.

In Fig. 1 it will be seen how that the butt joint strip shown at the top is not in transverse alignment with the butt joint strips connecting the other sections of the duct walls. Fig. 1 also shows how laterals may be turned off and bends made in the duct. The lateral duct 27 is shown and its side walls are connected by corner strips to the side walls of the main duct 28. The top and bottom walls of the duct 27 are connected to the top and bottom walls of the duct 28 by the interposition of the special butt joint and turning vane strip illustrated in Fig. 7, wherein I show two butt joint strips indicated at 29 connected in spaced relation by a series of similarly curved turning vanes 30, which are spot welded, brazed, or otherwise made fast to the inner or base portions 23 of the butt joint strips. This butt joint and turning vane strip may be supplied in suitable lengths on the job and cut to fit the openings for the laterals, and it serves both to seal the top and bottom joints and to interpose the turning vanes in the proper position and angular relationship to project into the main duct 28 and to deflect air currents therefrom without eddies or interference into the lateral duct.

Where it is desired to make a right angle or other bend in the main duct 28, this is done by cutting the duct walls for a miter and then cutting a butt joint and turning vane strip so that its butt joint strip sections 29 will fit between the oblique meeting edges of the main duct walls 30 and its upturned duct extension 30, and its vanes will be properly positioned to turn the air currents into duct 30. I show in this duct 30 a transition section 31 which flares upwardly, this section being formed with the corner strip or side plate arrangements as hereinbefore described, and at this point only all butt joints lie in the same plane and are closed by the meeting butt joint strips 29 in the manner described. The same is true at the upper end of the transition strip where it connects to the riser 32.

In Fig. 3 I show a metal lined duct in which the insulation strips 9 forming the top and bottom walls of the duct are cemented to a metal lining strip 10. Sheets of wall material thus prepared may be shipped to the job and cut to the desired width according to the capacity required for the duct. The side walls also of this duct may be assembled from like metal lined wall elements 9, 10, but I have shown the side walls formed by metallic wall strips 11 which are bent along their upper and lower edges to form the outwardly overhung pockets 25 and the inwardly facing pockets 26, and to provide the standard corner legs 15 and 16 for each corner strip. It is contemplated that separate strips of insulation, as 8, will be slid into the opposing pockets 25 of each wall strip 11 thus held in assembled relation to the side duct walls. Where these side plates are used, they and their insulating strips are shipped in stock widths and are cut to length on the job, the varying capacity of the duct being provided for by varying the width of the top and bottom walls which are customarily cut from stock sheets.

Where I use a butt joint strip I apply screws or the like which pass up through the strip walls 20 and 23 on both sides of the joint and through the ends of the wall sections that are received in the strip pockets. I thus fasten the meeting wall sections together, seal their joint and provide for it a neat trim or finish.

It will be noted that the exposed edges of the corner strip legs 15 and 16 are both similarly rolled to give a neat and attractive finish as well as to materially stiffen the strip for service as a corner reinforcement.

Where the side plates 11 are used, Fig. 3, the nails 18 are driven down, in the manner described for driving the nail sidewise, as in Fig. 2, and the nails may be driven at right angles through the corner strips if desired.

Ducts assembled according to my invention can be readily made up on the job from stock material, shipped collapsed, and adapted to the job without requiring expensive skilled labor or shop work.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A duct of the character described, having metallic side walls provided along opposite edges with elements defining divergent pockets, metal lined insulated duct walls adapted to be received in corresponding pockets of said side walls to complete the duct wall assemblage, insulation panels adapted to interfit in the other pockets of each side wall and insulate it, and means to secure the duct wall elements in assembled relationship.

2. A duct comprising wall members, corner brace means to assemble said wall members into duct form, and joint strips to connect the duct walls to divergent duct wall portions, and turning vanes connected to opposite joint strips and disposed to deflect the air currents at the joint.

3. A duct comprising wall members, corner brace means to assemble said wall members into duct form, and joint strips pocketed to receive and connect the duct walls to divergent duct wall portions, and turning vanes connected to opposite joint strips and disposed to deflect the air currents at the joint.

4. A butt joint and turning vane strip for ducts, comprising spaced strips each comprising means to make a tight butt joint between duct wall sections and turning vanes connecting said strips.

5. As an article of manufacture, a butt joint and turning vane strip for ducts, comprising spaced butt joint strips each having oppositely facing pockets adapted to receive the meeting ends of duct wall sections and turning vanes connected at their ends to the inner faces of the joint strips.

ROBERT WILEY SMITH.